S. T. SWASEY.
Glue-Drier.
No. 160,797.  Patented March 16, 1875.
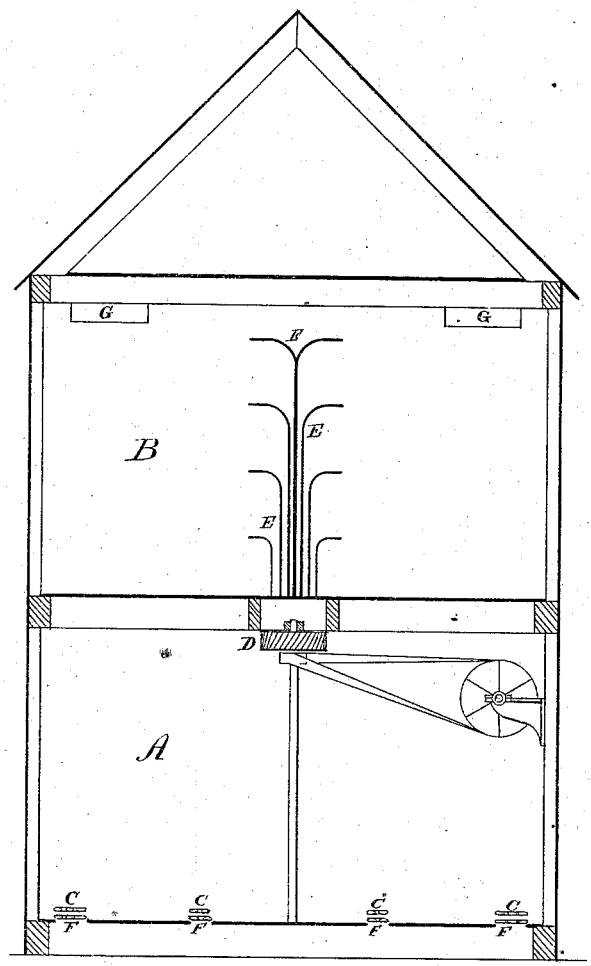
Witnesses.
J. R. Nichols
J. F. Brown
Inventor.
S. T. Swasey
by J. A. Bassett
atty.

UNITED STATES PATENT OFFICE.

SAMUEL T. SWASEY, OF SALEM, MASSACHUSETTS.

IMPROVEMENT IN GLUE-DRIERS.

Specification forming part of Letters Patent No. 160,797, dated March 16, 1875; application filed January 29, 1875.

*To all whom it may concern:*

Be it known that I, SAMUEL T. SWASEY, of the city of Salem, county of Essex and State of Massachusetts, have invented an Improved Apparatus for Drying Glue, of which the following is a specification:

My invention relates to an improved apparatus for drying glue; and consists in an arrangement of chambers heated by steam or other suitable method, and provided with means for introducing currents of heated air, and maintaining and controlling the circulation and direction of these currents at a temperature which has been found by experience to produce the best results.

In carrying my invention into practice, a suitable building is erected for the purpose, preferably of two stories, in the upper of which the glue is spread or stacked for drying, as in the usual manner. In the space or room under the drying-room I arrange a suitable number of steam-pipes or other heat-radiating surfaces, having proper connections with a boiler, and with valves for regulating and controlling the heat derived from the steam. The floor is arranged with suitable openings or registers for the admission of cold air, and arranged so that the supply of cold air may be regulated or entirely shut off, if desirable. At or near the center of the floor, between the steam-room and the drying-room, corresponding in size and shape to a blower or fan, which is fitted so as to take the heated air from the chamber below and force it into the drying-room. Over the blower I arrange a series of concentric tubes having openings at various points, corresponding to the height of the room, through which the heated air is delivered at different elevations, and deflected and blown out in a horizontal direction, directly against the glue which is spread in the chamber. I prefer to make these tubes with curved or trumpet-shaped outlets or deflectors, as shown in the drawing, the inner tube having a larger proportional diameter than the outer tubes, to compensate for the diminished area.

By these means the heated air is prevented from immediately rising to the top of the room, but is distributed more evenly in the different stratums or layers of glue.

The object of having a large space or steam-room below the drying-room is to have a reservoir of air which has an equable temperature, rather than to draw the air from a small space inclosing the steam-pipes.

A very high temperature is not required to properly dry the glue. It is more desirable to have a large volume of moderately-heated air and a free circulation of the currents directly through the frames supporting the glue.

It may be desirable in some cases to arrange a series of vertical wings above the blower to disseminate the heated air more thoroughly through the chamber. These wings may be driven from the blower-shaft.

A further modification of my arrangement may be made by placing the inlet for heated air and waste-outlet at opposite ends of the drying-chamber, the proper connections being made with a blower and the steam-space and drying-room.

The drawing represents a vertical section of a glue-drying house containing my invention.

A represents the steam-room; B, the drying-room; C, the steam-pipes; D, the fan or blower; E, the deflecting-pipes; F, the openings for cold air, and G the outlets for heated air.

I claim as my invention—

1. In an apparatus for drying glue, as herein described, by currents of heated air, the combination and arrangement of the steam-chamber and drying-room, and their connections, substantially as set forth.

2. In an apparatus for drying glue, the hot-air pipes E, arranged to deflect and divide the currents of heated air, substantially as shown and described.

SAMUEL T. SWASEY.

Witnesses:
J. A. BASSETT,
T. F. BROWN.